Figure 6:
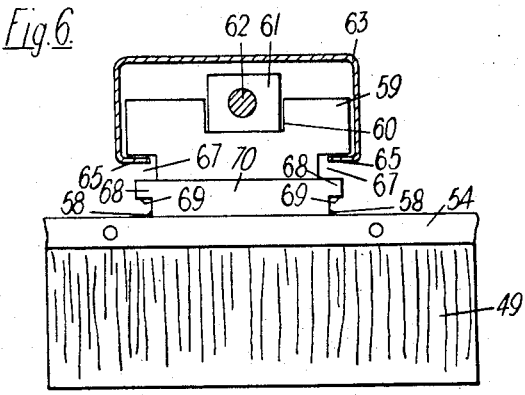

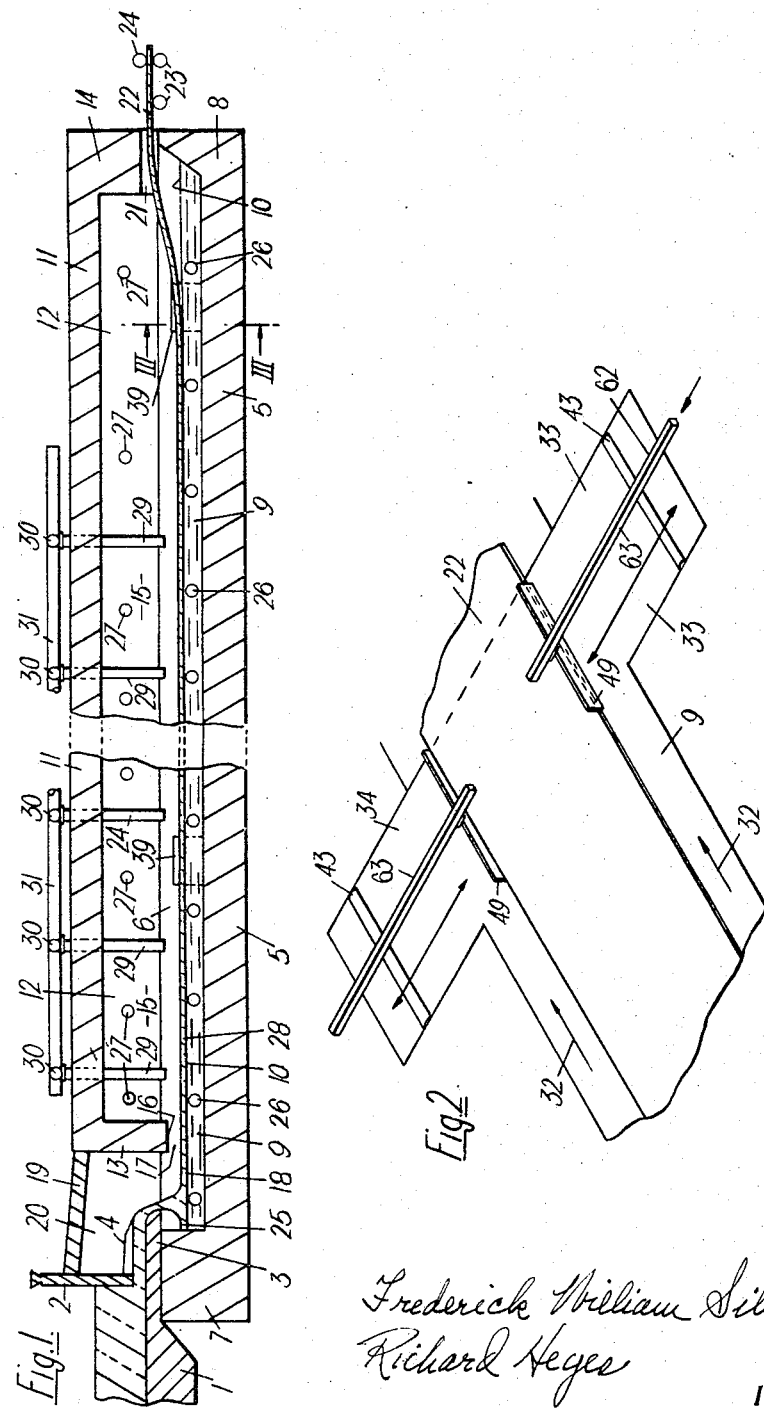

Sept. 26, 1967   F. W. SILVERWOOD ET AL   3,343,936
APPARATUS FOR SKIMMING DROSS FROM A MOLTEN METAL BATH
Filed May 18, 1964   3 Sheets-Sheet 2
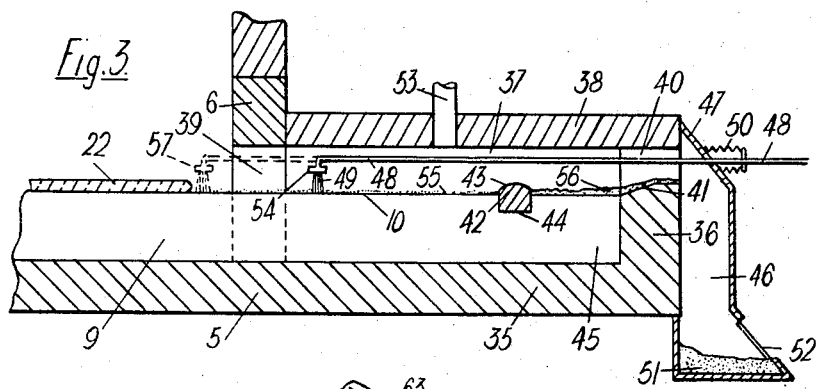
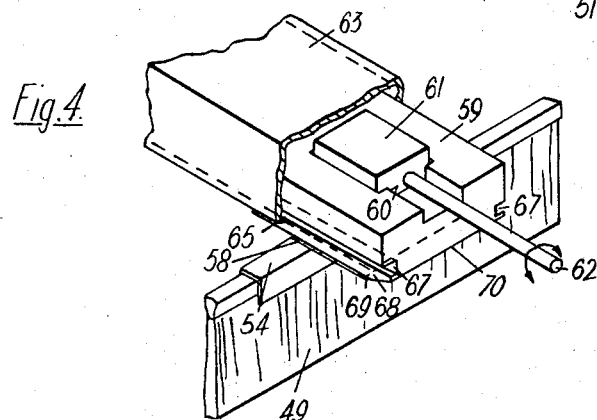
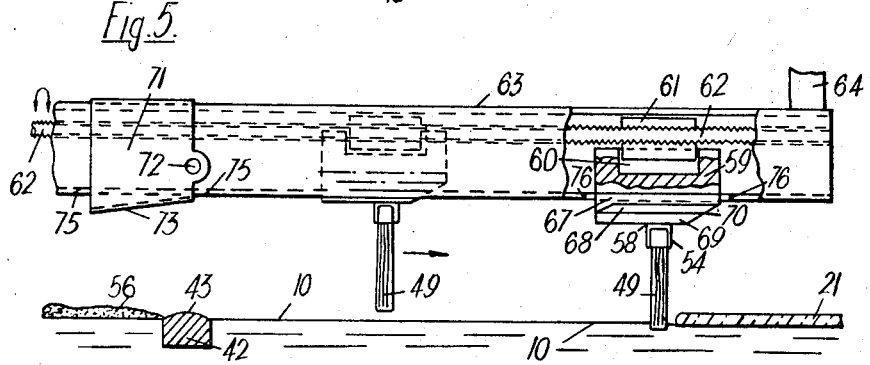

3,343,936
APPARATUS FOR SKIMMING DROSS FROM A MOLTEN METAL BATH

Frederick William Silverwood, Appley Bridge, and Richard Heyes, St. Helens, England, assignors to Pilkington Brothers Limited, Liverpool, England, a corporation of Great Britain
Filed May 18, 1964, Ser. No. 368,260
Claims priority, application Great Britain, May 20, 1963, 20,049/63
9 Claims. (Cl. 65—168)

This invention relates to the manufacture of flat glass in ribbon form and in particular to the manufacture of flat glass during which a ribbon of glass is advanced along a bath of molten metal.

The molten metal of the bath is, for example, molten tin or a tin alloy having a specific gravity greater than glass, for example the bath is so constituted as to have all the characteristics fully described in United States Patents Nos. 2,911,759 and 3,083,551.

In order to protect the molten metal of the bath a protective atmosphere is preferably maintained over the bath but the presence of traces of impurities in the atmosphere and in the molten metal bath may result in the formation of dross on the surface of the bath, this dross being composed of products of reactions between impurities and the bath metal.

Impurities in the bath of molten metal, for example oxygen and/or sulphur, may be scavenged from the bath by maintaining in the bath a trace of an element with which the impurities in the bath preferentially react, and products of the reaction of the trace element with impurities may also appear as a fine dross on the surface of the bath.

It is a main object of the present invention to provide an improved apparatus for manufacturing flat glass in ribbon form during which a ribbon of glass is advanced along a bath of molten metal and in which dross is removed from the surface of the bath.

According to the invention, in the manufacture of flat glass in ribbon form during which glass is advanced along a bath of molten metal, dross is directed to the surface of a zone of the molten metal of the bath adjacent the path of the glass along the bath, and the dross is extracted from the zone through an outlet for the dross.

Further according to the invention, in the manufacture of flat glass in ribbon form during which glass is advanced along a bath of the molten metal, dross is directed to the surface of a zone of the molten metal of the bath adjacent the path of the glass along the bath, the dross is collected in a defined region of said zone, and the collected dross is extracted through an outlet for the dross.

Further the invention comprehends in the manufacture of flat glass in ribbon form during which glass is advanced along a bath of molten metal, directing dross on the surface of the bath to the surface of a defined zone of the molten metal of the bath adjacent the path of the glass along the bath, and over a sill in the zone behind which sill the dross is collected, and extracting the collected dross through an outlet for the dross.

The dross collected behind the sill may be extracted through the outlet as soon as it has been collected, but the collected dross may have picked up some molten metal and it is preferred to permit this molten metal in the collected dross to drain into the bath of molten metal before the dross is extracted. From this aspect the invention includes retaining the collected dross behind the sill for a time sufficient to permit any molten metal in the dross to drain back into the zone of molten metal.

In one embodiment of the invention the dross is brushed along the surface of the zone of molten metal and over the sill. Preferably the brushing of the surface of the molten metal may extend close to the path of the ribbon of glass along the bath so that any dross near the edges of the ribbon is directed into the zone by the brushing which also carries the dross along the surface of the zone and over the sill.

In another embodiment of the invention dross may be directed, by a flow of bath atmosphere, from the surface of the bath adjacent the edges of the ribbon of glass onto the surface of said zone of molten metal. The dross may then be brushed along the surface of the zone and over the sill.

Further according to the invention, dross may be directed to the surface of the zone of molten metal by engendering movement of molten metal into the zone. Such movement may be engendered, for example, by inducing a circulation of the molten metal in the bath by pumping means or by a convection flow induced by the appropriate positioning of the heaters or coolers in the bath.

The zone of the bath in which dross may be collected is defined so as to provide easy access for dross directed from the rest of the bath into the zone. Preferably the zone is so defined that access to the zone for dross removal is through a side wall of the tank structure which contains the bath of molten metal. Desirably, according to the invention, the zone is constituted by a pocket of molten metal of the bath.

It has been found to be particularly advantageous to remove dross from the bath surface in the region of the outlet end of the bath where the ribbon of glass is taken up off the bath. From this aspect the invention comprehends in the manufacture of flat glass in ribbon form during which the glass in ribbon form is advanced along a bath of molten metal and is taken-up off the bath surface for discharge through an outlet from the bath, directing dross from the molten metal surface in the region of the outlet end of the bath to the surface of pockets of molten metal of the bath which pockets are respectively defined at each side of the bath in said region, collecting the dross behind a sill in each pocket, and extracting the collected dross from each pocket.

The bath surface is preferably wider than the ribbon of glass so that there are exposed areas of bath metal at the sides of the bath. Movement of the ribbon of glass over the bath surface causes dross to flow down the bath towards the outlet end thereof. The invention is also characterised by diverting said flow of dross into the pockets at the sides of the bath, for example by means of streams of bath atmosphere as described above.

The invention also comprehends apparatus for use in the manufacture of flat glass in ribbon form, comprising an elongated tank structure containing a bath of molten metal, means defining a zone of the bath of molten metal adjacent the path of travel of the glass along the bath, means for directing dross from the molten metal onto the surface of said zone of molten metal, retaining means in the zone behind which retaining means dross is collected, and an outlet through the tank structure for extracting the collected dross from the zone.

Further the invention provides apparatus for use in the manufacture of flat glass in ribbon form, comprising an elongated tank structure containing a bath of molten metal including a pocket of molten metal defined in a recess in the tank structure, means for advancing glass in ribbon form along the bath towards an outlet for the glass from the bath, a sill fixed in said recess across the pocket to delimit a region of the pocket, means for directing dross from the surface of the bath onto the surface of the molten metal in said recess and over the sill so that the dross is collected behind the sill, and an outlet from the recess through which the collected dross can be extracted.

In a preferred embodiment of apparatus according to the invention the sill is formed by the top surface of a bar e.g. of silicon carbide or carbon which is so mounted in the recess that its top surface is exposed above the level of the molten metal and its bottom surface is spaced from the floor of the recess to permit molten metal drained from the dross collected behind the sill to re-circulate into the bath of molten metal.

Preferably the recess is of rectangular form in a side wall of the tank structure, the inner end of the recess is open, the outer wall of the recess is formed with an outlet through which dross can be removed, and the bar extends between the sides of the recess near the outer wall so that dross is collected between the sill and the outer wall of the recess.

Further, apparatus according to the invention may include collecting means of a material which is resistant to attack by the molten metal of the bath extending between the side walls of the recess and mounted on a rod extending through the outer wall of the recess, and driving means connected to the collecting means and operable to cause said collecting means to direct dross over the sill from the surface of the molten metal in the pocket.

The collecting means may be a brush of a material which is resistant to attack by the molten metal of the bath. In an alternative embodiment the collecting means may be a carbon blade which is arranged to rake dross to the surface of the defined zone of the bath, and over the sill mounted in the zone.

The brush or blade may, in addition, be employed to direct dross into the pocket. Desirably according to the invention a brush is employed and is so mounted that it can brush dross into the pocket from the bath surface adjacent the path of the ribbon of glass.

The brush is preferably carried by support means arranged to lift and maintain the brush above the bath surface during movement of the brush inwardly of the tank structure, and to support the brush so as to extend just beneath the molten metal surface during the outward stroke of the brush.

In another embodiment of the invention dross is directed into the pocket by blowers arranged over the bath surface at the edges of the path of the ribbon of glass, and for connection to a supply of a protective atmosphere, said blowers being arranged to produce streams of atmosphere to divert dross along the surface of the molten metal into said pocket.

Figure 7:
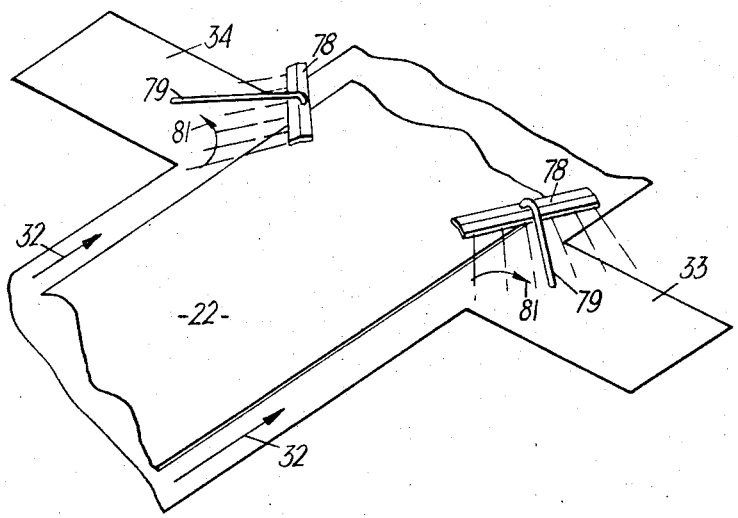

In order that the invention may be more clearly understood some embodiments thereof will now be described, by way of example, with reference to the accompanying diagrammatic drawings, in which:

FIGURE 1 is a central longitudinal sectional elevation of apparatus according to the invention comprising an elongated tank structure containing a bath of molten metal, and a superimposed roof structure and indicating the position of recesses in one side wall of the tank structure, FIGURE 2 is a diagrammatic perspective view of the region of the bath where a ribbon of glass is taken-up off the bath surface and showing a recess in either side of the tank structure, and brushes for brushing dross along the surface of the molten metal, FIGURE 3 is a section on line III—III of FIGURE 1 showing in detail the construction of one of the recesses in the tank side wall, FIGURE 4 illustrates the mounting of one of the brushes of heat resisting material on brush supporting means, FIGURE 5 is a longitudinal section through the brush supporting means, FIGURE 6 is an end elevation, partly in section of the brush supporting means, and FIGURE 7 illustrates blowers for blowing dross onto the pockets of molten metal in the recesses.

In the drawings the same reference numbers designate the same parts.

Referring to FIGURE 1 of the drawings, a forehearth of a continuous glass melting tank is indicated at 1 and a regulating tweel at 2. The forehearth ends in a spout comprising a lip 3 and side jambs 4, one of which is shown. The side jambs 4 and lip 3 form a spout of generally rectangular cross section. A cover may be secured over the spout in known manner.

The spout 3, 4 is disposed above the floor 5 of a tank structure including side walls 6 joined together by end walls 7 and 8 integral with the side walls 6 and the floor 5. This tank structure contains a bath 9 of molten metal, for example molten tin or an alloy of tin having a specific gravity greater than glass. The level of the surface of the bath is indicated at 10.

A roof structure is supported on the tank structure, and the roof structure includes a roof 11, side walls 12 and end walls 13 and 14 respectively at the inlet and outlet ends of the bath. The roof structure thus provides a tunnel over the bath and defines a headspace 15 over the bath.

The lower face 16 of the end wall 13 defines with the surface 10 of the bath an inlet 17, which is restricted in height, for glass 18 as it is advanced along the bath. The roof structure is extended to the tweel 2 by a roof element 19, and side walls 20 which form a chamber in which the spout is situated. The lower face of the end wall 14 of the roof structure defines with the end wall 8 of the tank structure an outlet 21 for the ultimate ribbon of glass 22 which is discharged from the bath.

Driven conveying rollers 23 are mounted outside the outlet end of the tank and are disposed somewhat above the level of the top of the tank end wall 8. Superimposed driven rollers 24 are provided, and the rollers 23 and 24 co-operate to apply a tractive effort to the ribbon of glass 22 moving towards the outlet 21 from the bath, which tractive effort assists in advancing the ribbon of glass along the bath. The ribbon 22 is directed by the rollers to a conventional tunnel lehr in which the ribbon is annealed, as is well understood in the art, and on leaving the lehr the ribbon is cut into sheets of desired size.

Molten glass is poured on to the bath 9 of molten metal from the spout 3, 4. The tweel 2 regulates the flow of molten glass from the spout lip 4 and the spout is vertically spaced from the surface of the bath so that the molten glass has a free fall of a few inches to the bath, which distance is such as to ensure a heel 25 of molten glass being formed behind the glass falling from the spout, which heel extends rearwardly to the end wall 7 of the tank structure.

The temperature of the bath is regulated from the inlet end to the discharge end by providing thermal regulators 26 immersed in the molten metal bath 9. Radiant heaters 27 are provided in the headspace 15 to assist the temperature regulation. The temperature regulators 26 and 27 at the inlet end of the bath are devised to maintain the temperature at the inlet end at about 1,000° C. or slightly higher over a sufficient length of the bath to ensure that the molten glass is advanced along the bath as a buoyant layer of molten glass 18 from which is developed a buoyant body of molten glass 28. The width of the tank structure is somewhat greater than the width of the buoyant body 28 at the surface level of the bath so that the buoyant layer 18 is able to flow laterally unhindered to the limit of its free flow to develop the buoyant body 28 of molten glass which is then advanced in ribbon form along the bath.

The temperature regulators 26 and 27 spaced down the bath maintain a temperature gradient such that the ribbon is cooled to a state in which it can be taken off the bath unharmed by mechanical means by the time it nears the outlet end of the bath. That is, the ribbon 21 has been progressively cooled to a temperature of about 600° C. before being taken up off the bath by the conveying rolls 23 as shown in FIGURE 1.

The roof structure 11 is at intervals provided with ducting 29 connected by branches 30 to headers 31 through which a protecting gas is fed into the headspace 15 over the bath to create a plenum of protecting gas in the substantially closed headspace. The protecting gas is a gas which will not react chemically with the metal of the bath to produce contaminants for the glass, and therefore protects the bath surface at the sides of the ribbon and under the stiffened ribbon 22 leaving the bath. Ingress of external atmosphere through the restricted inlet 17 and outlet 21 is substantially prevented.

However, minute traces of impurities, for example oxygen and/or sulphur may be present in the atmosphere over the bath or may migrate into the bath from the glass delivered to the bath. These impurities may react with the bath metal to produce reaction products which may appear in the form of a fine film of dross on the bath surface.

A trace of an additive metal may be maintained in the molten metal bath 9 in order to scavenge impurities from the bath by preferential reaction of the additive metal with the impurities. This scavenging action, for example when using scavenging metal such as manganese or magnesium or zinc may result in reaction products such as oxides or sulphides of these metals which appear in the form of a fine dross on the surface of the bath.

The dross appears at the sides of the bath between the edges of the ribbon of glass and the side walls 6 of the tank structure and the movement of the ribbon of glass down the bath causes a flow of the film of dross down the bath surface towards the outlet end of the bath.

The present invention relates to the removal of dross from the molten metal surface and is preferably applied in the region of the outlet end of the bath, in which region the ribbon of glass is taken-up off the bath surface.

A preferred embodiment of the invention is described below in relation to the removal of dross from the bath in the region where the ribbon of glass is taken up off the bath surface, but it will be understood that the same method may be applied in any other region of the bath for the removal of dross from the bath.

FIGURE 2 indicates diagrammatically a part of the bath in the region of the outlet end of the bath. The flow of the film of dross down the sides of the bath is indicated by the arrows 32. The side walls 6 of the tank structure are formed with recesses each defining a zone of the bath in the form of a pocket of molten metal of the bath, the pockets being indicated by the references 33 and 34. These pockets are shown opposite the take-up of the ribbon from the bath surface, but pockets may be located right at the outlet end of the bath adjacent the end wall 8 of the tank structure.

One of the recesses containing a pocket of molten metal 34 is illustrated in greater detail in FIGURE 3. The tank floor 5 is extended sideways to form the floor 35 of the recess and an integral end wall 36 forms the outer wall of the recesses. The recess also includes side walls 37 which abut against the side walls 6 of the tank structure, and a roof 38 supported on the top of the outer wall 36 and the side walls 37, and extends up to the side wall 6 of the tank structure. There is a channel 39 in the side wall 6, with which channel 39 the open inner end of the recess, communicates. The outer wall 36 of the recess defines an outlet 40 through which dross is extracted from the recess and the top surface of the wall 36 is sloped upwardly from the surface level of the molten metal, as indicated at 41 to facilitate the extraction of dross.

A bar 42, for example of silicon carbide or carbon, is mounted in the recess and extends between the side walls 37 and is so fixed that the top surface 43 of the bar 42 is exposed above the level 10 of the molten metal in the recess. The bottom surface 44 of the bar 42 is spaced from the floor 35 of the recess. The bar 42 is parallel to the end wall 36 and is located near that end wall so that a surface region 45 of the pocket of molten metal is delimited between the bar 42 and the wall 36.

The bar 42 has a cross-section of rectangular form with a curved top. Alternatively the bar may be wedge-shaped with the thin edge of the wedge pointing inwardly towards the channel 39, so that dross can be brushed or raked up the sloping face of the wedge.

An outlet chamber 46 for receiving extracted dross is fixed to the wall 36. The chamber 46 has a sloping roof 47 through which passes a rod 48 on which a brush 49, to be described below, is mounted. The rod 48 passes through a flexible seal 50 fixed to the roof 47. Extracted dross, indicated at 51, falls to the bottom of the chamber 46, where there is a door 52 through which extracted dross can be cleared from the chamber 46. Protective atmosphere is supplied to the headspace over the pocket of molten metal 34 in the recess through a duct 53 extending through the roof 38 of the recess.

The brush 49 is a flat brush of heat resistant steel wires and extends across the recess between the side walls 37. The brush 49 is held in a brush clip 54 which is fixed to the rod 48. By means of a mechanism to be described below the brush is operated from outside the tank structure so that the brush is drawn over the surface of the molten metal 34 towards the sill 43 thereby brushing any dross on the surface of the pocket of molten metal up to and over the sill 43. A fine film of dross on the surface of the molten metal is indicated at 55, although the dross 55 shown in the drawing is not indicative of the actual thickness of any dross film which may be present. The dross is collected behind the sill 43, as indicated at 56, and retained by the sill 43 in the region 45 of the pocket between the sill 43 and the wall 36, when the brush is moved into the tank for a further brushing operation. The brush 49 moves just beneath the surface of the molten metal during its outward stroke without substantially dipping down therein even at the middle of its stroke in order to ensure that the whole of the dross film in the path of the brush is collected and no substantial amount of it is mixed with the molten metal. Inevitably some molten metal is carried with the dross 55 over the sill 43, but the collected dross 56 is allowed to remain behind the sill for a time sufficient to permit any molten metal in the dross 56 to drain back into the region 45 of the pocket of molten metal. The dross 56 is then extracted through the outlet 40 either by means of the brush 49 or by means of a separate raking tool, and falls into the bottom of the chamber 46 from which it is removed from time to time through the door 52.

The maximum stroke of the brush may be extended so that it commences at the edge of the ribbon of glass, as indicated by the dotted lines 57 in FIGURE 3, so that the brush can also be employed to direct dross from the surface of the molten metal alongside the ribbon of glass onto the surface of the pocket of molten metal 34. This position of brushes 49 at the beginning of the brushing stroke at each side of the ribbon of glass is also shown in FIGURE 2. In this manner of operation according to the invention the complete outward stroke of each brush not only directs dross from the molten metal surface adjacent the ribbon onto the pockets but also brushes the dross over the pockets and over the sills 43 behind which the dross is collected.

The supporting means for the brushes is illustrated in greater detail in FIGURES 4, 5 and 6. The brush clip 54 is welded as indicated at 58 to the bottom of a support block 59. The top of the support block 59 is formed with a shaped recess 60 in which a traversing nut 61 fits. The nut 61 is mounted on a leadscrew 62 which extends through the flexible seal 50 in the roof 47 of the chamber 46. The leadscrew 62 is mounted in a rectangular hollow section tube 63 which extends over the surface of the pocket of molten metal and over the position of the edge of the ribbon of glass. The inner end of the tube 63 is fixed to the roof 11 over the tank by a mounting 64. The bottom of the tube 63 is formed as a slot the edges 65 of which form a trackway for engagement by the brush support block 59 so that when the leadscrew 62 is rotated by a reversible electric motor, not shown, mounted outside the tank structure, the traversing nut moves along the leadscrew, thereby causing the brush 49 to move to-and-fro relative to the surface of the pocket of molten metal.

During its outward stroke into the pocket 34 the brush 49 just dips below the surface 10 of the molten metal in order to carry the dross film 55 back over the sill 43, but for its inward traverse up to the edge of the ribbon of glass 21 the brush must be raised above the surface of the molten metal.

The shape of the lower part of the block 69 is shown in FIGURE 6. Deep longitudinal grooves 67 are formed in the sides of the block 59, and in the lower, de-drossing position of the brush 49 the tracks 65 of the tube 63 engage in these grooves 67. Below the grooves 67 there are longitudinal ribs 68, and there is a step 69 under each of the ribs. The outer faces of the ribs 68 are set back with respect to the side faces of the block 59, and the front lower edge of the block is chamfered as shown at 70.

In its de-drossing position shown in FIGURES 4, 5 and 6, the brush 49 just dips into the surface 10 of the molten metal. Although the block 59 is displaced downwardly relative to the traversing nut, there is still driving contact between the nut and the block so that rotation of the leadscrew 62 in the appropriate sense causes movement of the brush outwardly over the molten metal surface 10 and over the sill 43.

Near the other end of the tube 63 there is mounted on the tube 63 a U-shaped bridge piece 71 which fits over the tube 63, and is pivotally mounted on pivots 72 fixed to the sides of the tube 63. The lower edge of each side of the bridge piece 71 is bent inwardly under the tube 63 to form a ramp surface 73 which slopes upwardly in an inward direction towards the inner end of the recess.

When the brush 49 is nearing the end of its outward, re-drossing stroke, the upper surfaces of the ribs 68 engage under the ramps 73 so that the bridge piece 71 pivots upwardly to allow the brush support block 59 to be carried outwardly to the end of the stroke.

When the support block has moved past the bridge piece 71, the bridge piece falls to its normal position shown in FIGURE 5. The electric motor driving the leadscrew 62 is reversed, the brush moves inwardly, and the step surfaces 69 on the block 59 engage the upper surfaces of the ramps 73 so that the support block is lifted upwardly as it moves inwardly until the brush 49 is lifted clear of the surface of the dross 56 collected behind the sill 43 before it passes back over the sill.

The tracks 65 are cut away, as indicated at 75 to permit the ribs 68 to move upwardly above the level of the tracks 65 which then engage in the steps 69 under the ribs 68 as the support block moves on along the tube, as shown at the left-hand side of FIGURE 5.

Near the inner end of the tube 63, the tracks 65 are cut away as indicated at 76, to an extent only sufficient to permit the ribs 68 to fall downwardly through the cut-away tracks 76, while the cut-away tracks still engage under the top surfaces of the grooves 67 to hold the brush 49 just dipping into the molten metal surface 10 ready for the next outward de-drossing stroke.

In this arrangement the movement of the brush 49 is such that it just carries the brushed dross over the sill 43. A rake operated by hand from outside the tank structure is employed to remove collected dross 56 into the chamber 46.

Other means may be provided for directing dross into the pockets of molten metal. In one alternative the brush 49 is replaced by a carbon blade which acts as a scraper or rake as it directs dross to the surface of the zone of molten metal. The blade is mounted on the same traversing mechanism as just described for operation of the brush 49. Another alternative is illustrated in FIGURE 7 in which blowers 78 fed with bath atmosphere through pipes 79 blow atmosphere in a direction which is at an angle with respect to the direction of advance of the ribbon of glass along the bath, so that dross moving in the direction 32 down the sides of the bath is diverted to the surfaces of the pockets of molten metal as indicated at 81. The dross is then brushed or raked over the pocket surface and collected behind the sills 43, the stroke of the brushes 49 or carbon blades being arranged so that the maximum inward traverse ends near the inner end of the recess.

In a modified arrangement, the bar 42 may be dispensed with and the dross directed from the molten metal up onto the sloping surface 41 of the end wall 36, where it remains for a sufficient time to allow any molten metal to drain out of the collected dross and into the bath.

As a further alternative, rollers of suitable material, for example carbon, stainless steel or spheroidal graphite cast iron, may be mounted at the open inner end of each recess. The rollers are partially immersed in the molten metal, so that when the rollers are rotated movement of the surface metal is engendered into the pockets and dross is carried into the pockets, which dross is then brushed or raked over the sills 43 in the manner described above.

Other methods may be employed for directing dross into the zones of molten metal of the bath, for example by inducing circulation of the molten metal to cause dross to be carried on to the surfaces of the zones, where it is retained. Such circulation may be induced by means of heat exchangers immersed in the molten metal to cause a surface flow of molten metal into the zone thereby carrying dross into the zone.

In the preferred embodiments of the invention described above the zones of the molten metal of the bath, on to the surface of which zones dross is directed, are pockets of molten metal defined in recesses in the tank structure. Each zone may however take any other suitable form; for example an area of the exposed surface of the bath alongside the ribbon which area of the bath surface is delimited by structural elements connected to a side wall of the tank structure and extending into the bath from the side wall. Alternatively there may be two zones each in the form of a lateral lane extending longitudinally of the bath alongside the path of travel of the glass along the bath.

There are thus provided means for minimising the presence of dross on the surface of the bath of molten metal, so that any dross produced, for example by the continual scavenging of the bath metal by means of an additive, is removed from the bath as it is formed, and subsequently extracted from the tank structure containing the bath.

We claim:

1. Apparatus for use in the manufacture of flat glass in ribbon form comprising a tank containing a bath of molten metal, means for delivering glass to the bath and advancing the glass along the bath in ribbon form, means defining a zone of the bath of molten metal adjacent to the path of travel of the glass along the bath in which zone dross is collected and a region to which collected dross may be directed, and non-dipping means for directing dross along said zone to said region.

2. Apparatus according to claim 1, including blowers arranged over the bath surface at the edges of the path of the ribbon of glass, and for connection to a supply of a protective atmosphere, said blowers being arranged to produce streams of atmosphere to direct dross along the surface of the molten metal into said pocket.

3. Apparatus for use in the manufacture of flat glass in ribbon form, comprising an elongated tank structure containing a bath of molten metal, means associated with the tank structure for delivering glass to the bath and advancing the glass along the bath in ribbon form, structural elements of the tank structure defining a zone of the bath of molten metal adjacent the path of travel of the glass along the bath, which zone has an upper surface constituting an extension of the upper surface of the bath, non-dipping dross directing means mounted in the tank structure in the region of said zone so as to direct dross along the bath surface onto the surface of the zone of molten metal, a retaining bar mounted across the zone to define a region of the zone in which dross is collected, and an outlet through said structural elements defining said zone for extracting the collected dross from the zone.

4. Apparatus for use in the manufacture of flat glass in ribbon form, comprising an elongated tank structure containing a bath of molten metal, means associated with the tank structure for delivering glass to the bath and advancing the glass along the bath in ribbon form, structural walls of the tank structure defining a recess in the tank structure which contains a pocket of molten metal of the bath, means for advancing glass in ribbon form along the bath towards an outlet for the glass from the bath, a sill fixed in said recess across the pocket to delimit a region of the pocket, collecting means of a material which is resistant to attack by the molten metal of the bath extending between the side walls of the recess and including a mounting rod extending through the outer wall of the recess which rod is supported above the metal surface so that the collecting means throughout the extent of the collecting movement thereof just touches the surface of the molten metal, and driving means connected to the collecting means and operable to cause said collecting means to direct dross over the sill from the surface of the molten metal.

5. Apparatus according to claim 4, wherein the sill is formed by the top surface of a bar e.g. of silicon carbide or carbon, which is so mounted in the recess that its top surface is exposed above the level of the molten metal and its bottom surface is spaced from the floor of the recess to permit molten metal drained from the dross collected behind the sill to recirculate into the bath of molten metal.

6. Apparatus according to claim 5, wherein the recess is of rectangular form in a side wall of the tank structure, the inner end of the recess is open, the outer wall of the recess is formed with an outlet through which dross can be removed, and the bar extends between the sides of the recess near the outer wall so that dross is collected between the sill and the outer wall of the recess.

7. Apparatus according to claim 4, wherein the directing means is a brush of a material which is resistant to attack by the molten metal of the bath and there is provided stiff operating means for moving said brush along a dross-directing course throughout the extent of which it moves just beneath the surface of the bath.

8. Apparatus according to claim 7, wherein the brush is so mounted that it can brush dross into the pocket from the bath surface adjacent the path of the ribbon of glass.

9. Apparatus according to claim 8, wherein the brush is carried by support means arranged to lift and maintain the brush above the bath surface during movement of the brush inwardly of the tank structure, and to support the brush just extending beneath the molten metal surface during the outward stroke of the brush.

References Cited
UNITED STATES PATENTS

| | | | |
|---|---|---|---|
| 1,515,616 | 11/1924 | Poppenhusen | 75—78 |
| 1,538,229 | 5/1925 | Weaver | 65—134 |
| 2,158,694 | 5/1939 | Fenton | 134—9 |
| 2,880,876 | 4/1959 | Dujardin | 210—525 |
| 2,920,763 | 1/1960 | Lind et al. | 210—525 |
| 3,083,551 | 4/1963 | Pilkington | 65—99 |
| 3,220,813 | 11/1965 | Nogard et al. | 65—65 |

DONALL H. SYLVESTER, *Primary Examiner.*

G. R. MYERS, *Assistant Examiner.*